United States Patent [19]

Gomberg et al.

[11] 4,354,906
[45] Oct. 19, 1982

[54] COMBINED RADIOLYTIC AND THERMOCHEMICAL PROCESS FOR GENERATION OF HYDROGEN

[75] Inventors: Henry J. Gomberg; Rupert A. Lee; John G. Lewis, all of Ann Arbor, Mich.

[73] Assignee: Texas Gas Transmission Corporation, Owensboro, Ky.

[21] Appl. No.: 123,375

[22] Filed: Feb. 21, 1980

[51] Int. Cl.$^3$ ............................................ B01J 19/08
[52] U.S. Cl. ........................ 204/157.1 H; 204/157.1 R
[58] Field of Search .................. 204/157.1 H, 157.1 R, 204/157.1 W

[56] References Cited

U.S. PATENT DOCUMENTS 3,434,949  3/1969  Jones ............................ 204/157.1 H
4,097,348  6/1978  Gomberg ..................... 204/157.1 H

FOREIGN PATENT DOCUMENTS 1137210  12/1968  United Kingdom ........ 204/157.1 H

Primary Examiner—Howard S. Williams
Attorney, Agent, or Firm—Barnes, Kisselle, Raisch & Choate

[57] ABSTRACT

A combined radiolytic and thermochemical closed cycle process for production of hydrogen from water wherein $H_2S$ is dissociated at high temperature and pressure by radiation, such energy being sufficient to provide dissociation and additionally to heat the reaction products to about 1100° K. Hydrogen is separated from the radiolytic reaction products. The sulfur product is reacted with water in multiple additional thermochemical process steps for which heat of reaction is supplied by the radiolytic reaction products for reconstitution of the $H_2S$ working fluid and generation of an oxygen byproduct.

8 Claims, 6 Drawing Figures

COMBINED RADIOLYTIC AND THERMOCHEMICAL PROCESS FOR GENERATION OF HYDROGEN

The present invention relates to gas conversion cycles, and more particularly to cycles or processes for generation of combustible gaseous fuel. Yet more specifically, the invention relates to closed cycle processes for generation of hydrogen by decomposition of water.

A general object of the invention is to provide an efficient closed cycle process for generation of combustible fuel, specifically hydrogen, by dissociation of water. In furtherance of the above, a more specific object of the invention is to provide a hydrogen generation process combining radiolytic and thermochemical effects for enhanced efficiency and economy.

Figure 1:
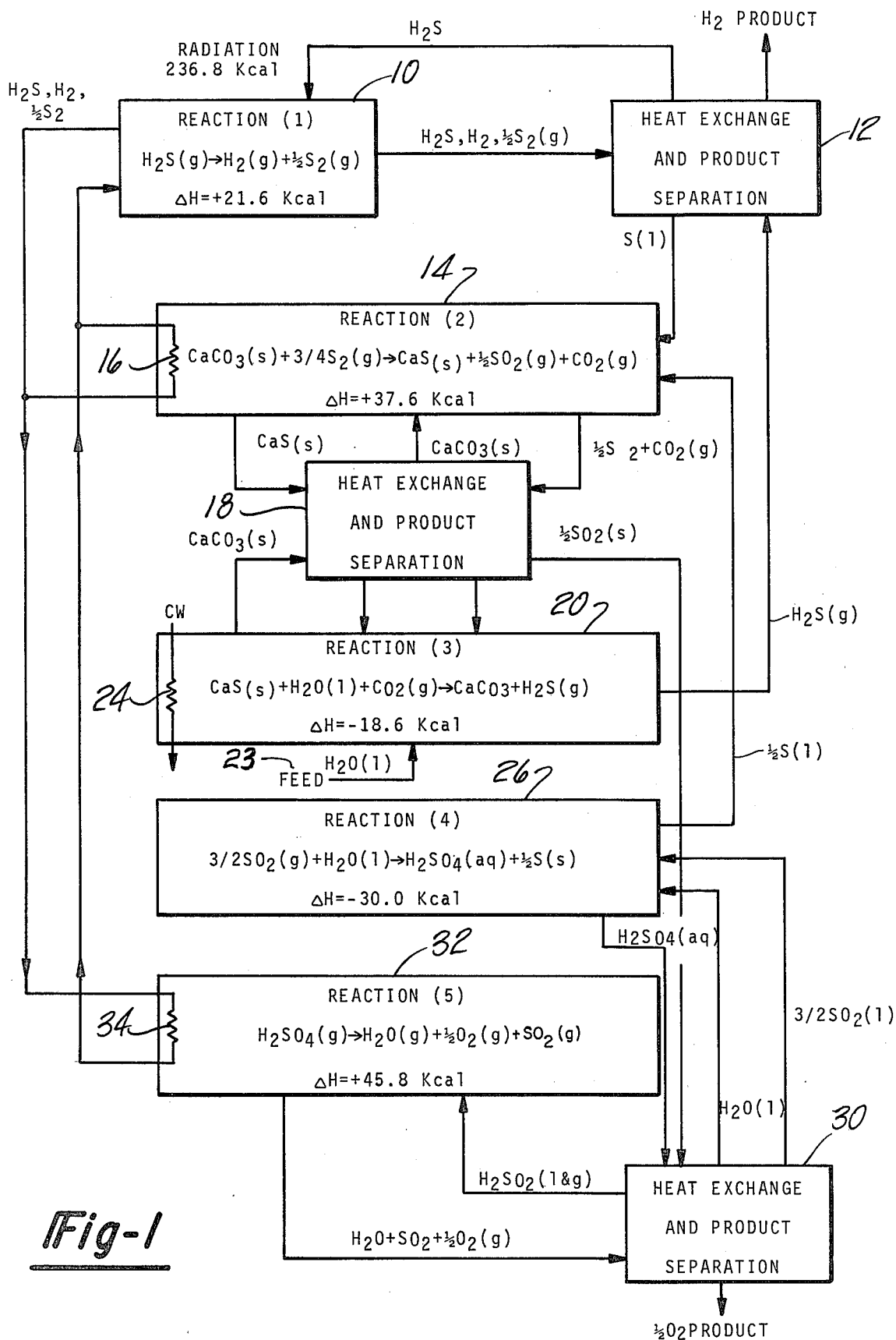
Figure 2:
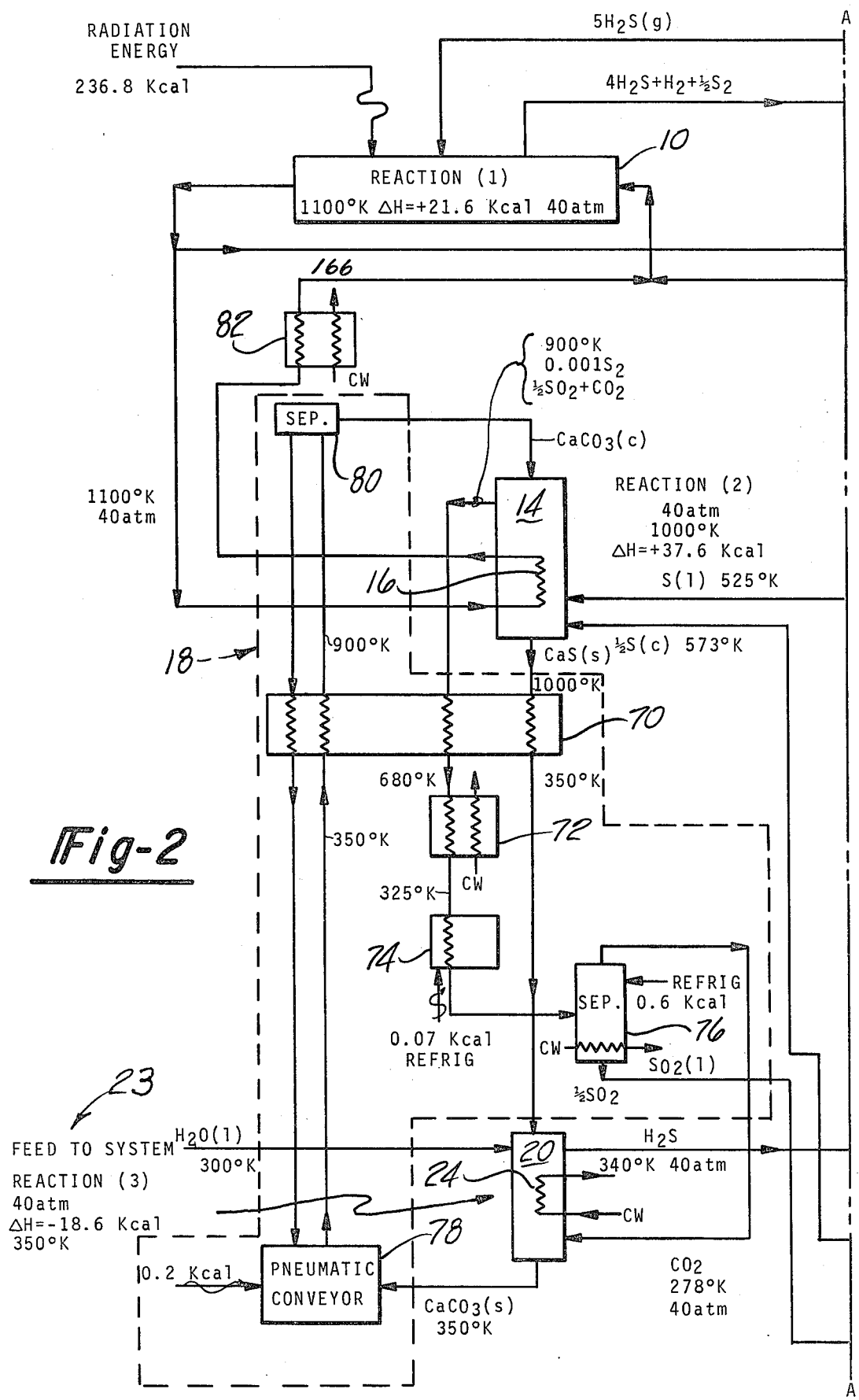
Figure 3:
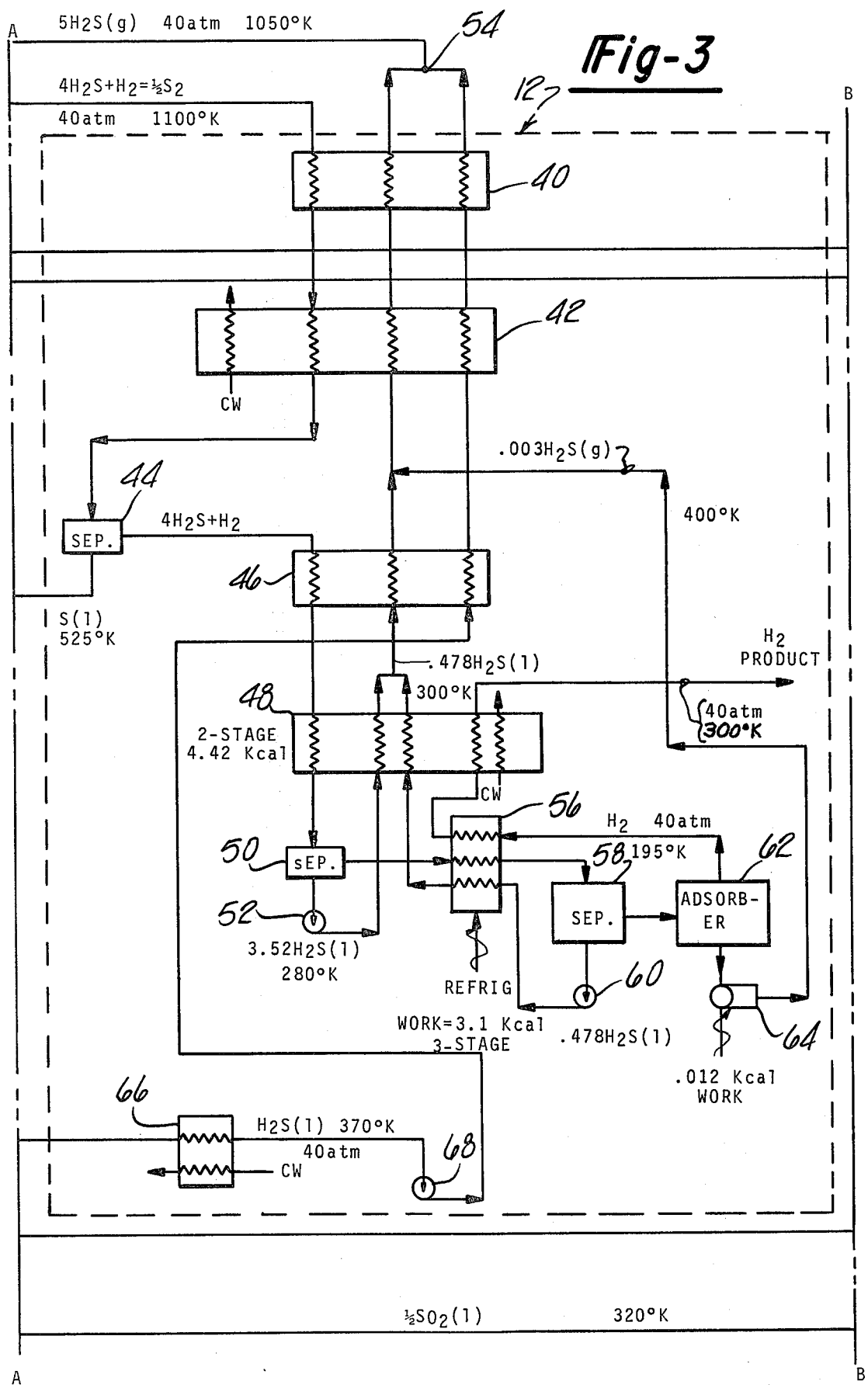
Figure 4:
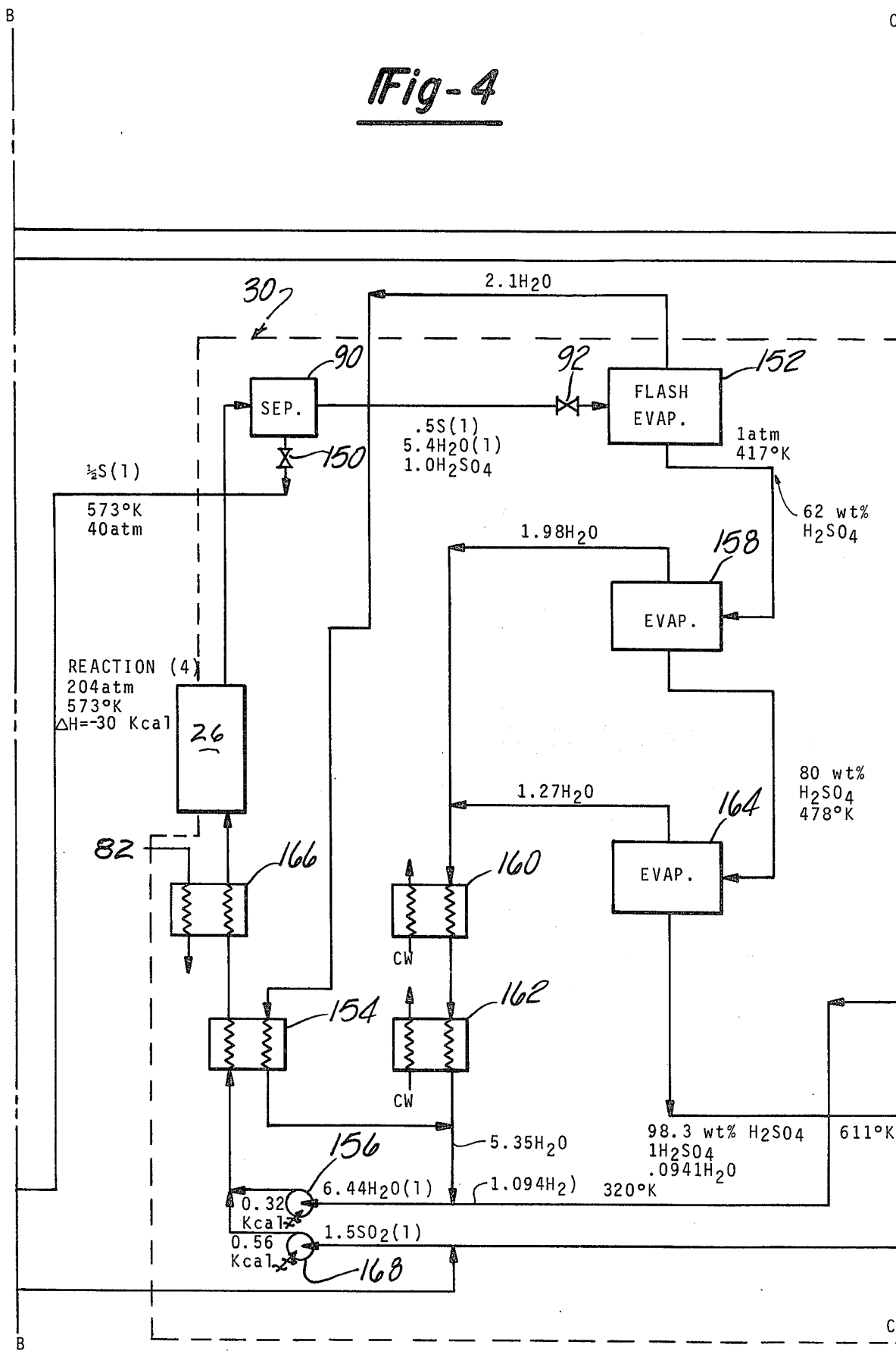
Figure 5:
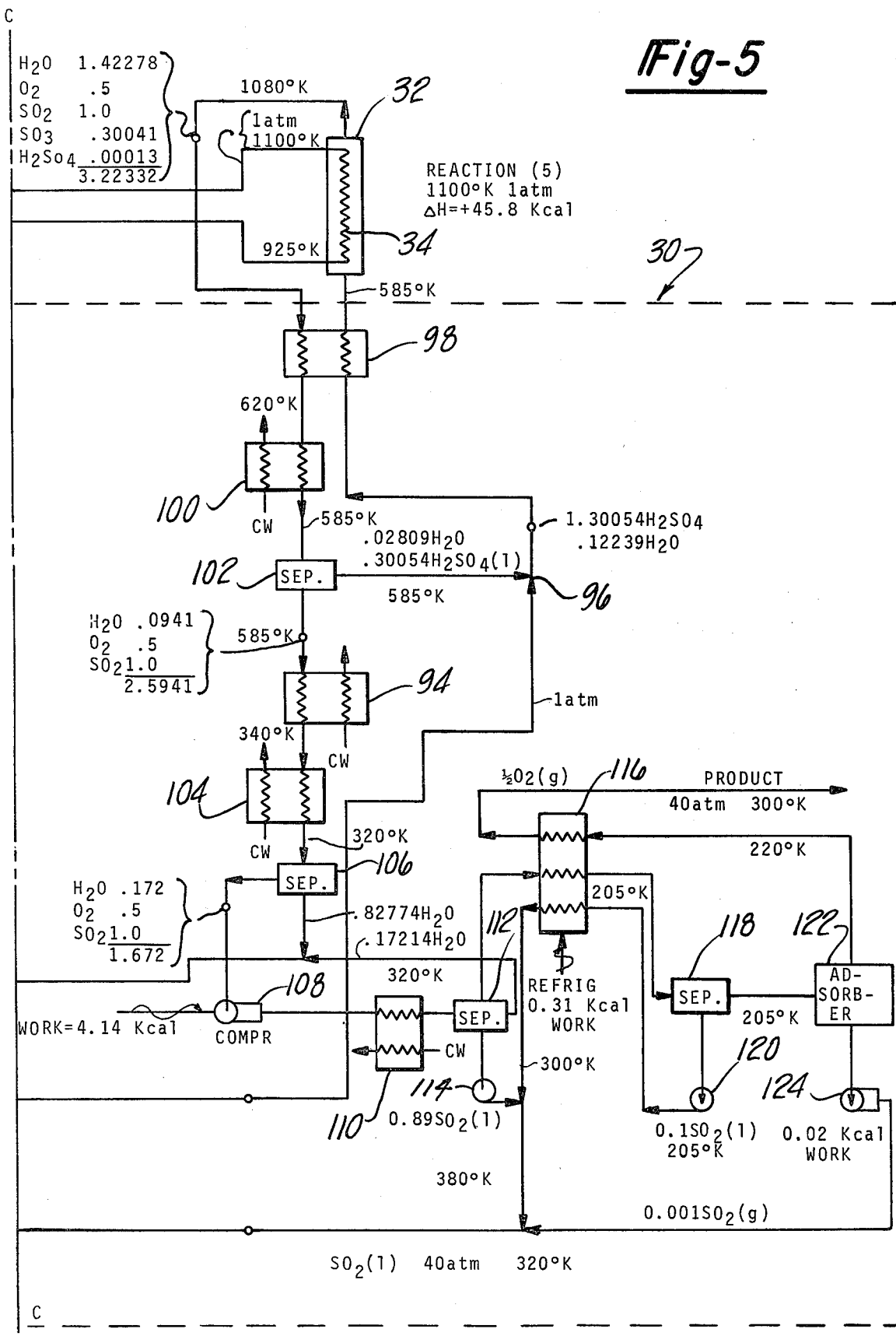
Figure 6:
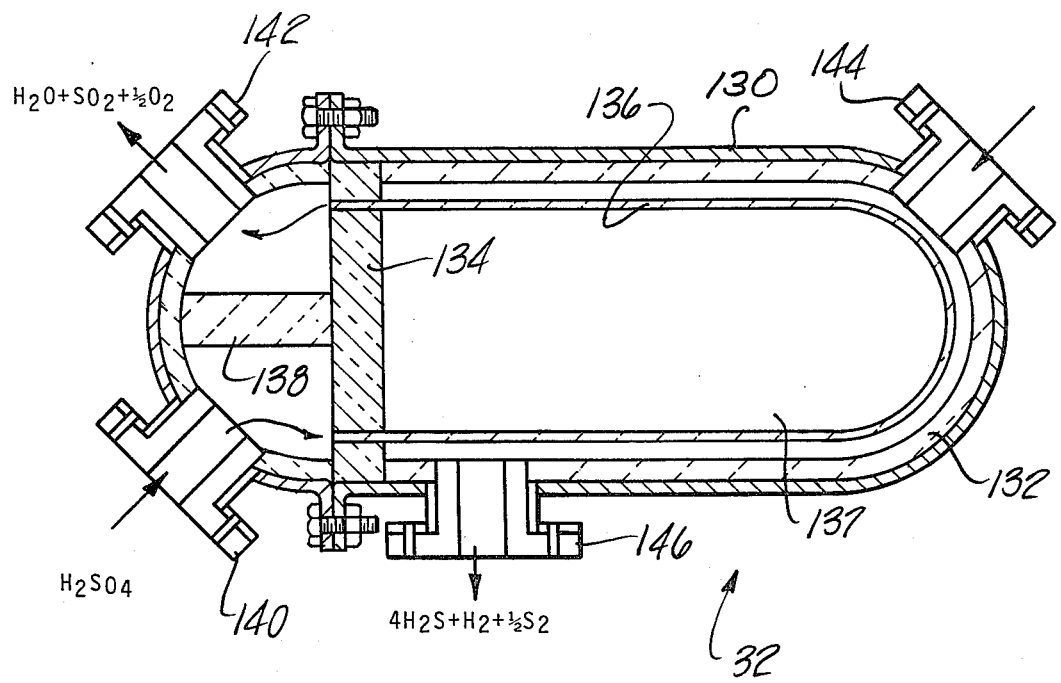

The invention, together with additional objects, features and advantages thereof, will be best understood from the following description, the appended claims and the accompanying drawings in which:

FIG. 1 is a functional block diagram of a presently preferred embodiment of the hydrogen generation process in accordance with the invention;

FIGS. 2, 3, 4 and 5 together comprise a schematic diagram of the process illustrated in block form in FIG. 1, FIGS. 2 and 3 being interconnected along the line A—A in each FIG., FIGS. 3 and 4 being interconnected along the line B—B in each FIG., and FIGS. 4 and 5 being interconnected along the line C—C in each FIG.; and FIG. 6 is a sectional view schematically illustrating a chamber for cracking sulfuric acid in the process of FIGS. 1-5.

In accordance with the present invention it has been found that the "G value" for dissociation of certain compounds increases with temperature. "G value" is the number of molecules reacted per hundred electron volts of radiation energy absorbed. In particular, it has been found that the G value for endothermic dissociation of certain compounds increases with temperature. Endothermic dissociation is the dissociation of a compound by means of an endothermic reaction. In such an endothermic dissociation energy must be added to the compound in order to cause it to dissociate. This is thought to occur because chemical bonds are "preliminarily strained" by increasing temperature, rendering the molecules more susceptible to radiolytic dissociation. Thus, exposure of the selected compound to both heat and radiation synergistically increases dissociation yield over the yield due to the same amount of heat or radiation energy taken separately.

A presently preferred embodiment of the closed cycle process in accordance with the invention embodies the following five reaction steps:

$H_2S \rightarrow H_2 + \tfrac{1}{2}S_2$     (1)

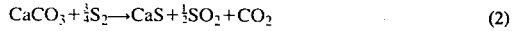

$CaCO_3 + \tfrac{1}{3}S_2 \rightarrow CaS + \tfrac{1}{3}SO_2 + CO_2$     (2)

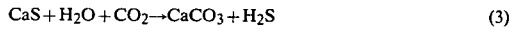

$CaS + H_2O + CO_2 \rightarrow CaCO_3 + H_2S$     (3)

$3/2 SO_2 + H_2O \rightarrow H_2SO_4 + \tfrac{1}{2}S$     (4)

$H_2SO_4 \rightarrow H_2O + SO_2 + \tfrac{1}{2}O_2$     (5)

Referring to FIG. 1, Reaction (1) ($\Delta H = +21.6$ Kcal/grammole) is carried out in a vessel 10 at conditions of high temperature and pressure by subjecting vessel 10 to intense radiation. A reaction temperature in vessel 10 of 1100° K. is preferred so that the heat energy of the products of Reaction (1) may be used to drive Reactions (2) and (5) as will be described. A pressure of 40 atm. is preferred to permit condensation of the sulfur reaction product and hydrogen sulfide thereby to facilitate separation from the hydrogen, and also to reduce the required size of vessel 10.

At room temperature, the "G value" for hydrogen sulfide is equal to 7.7 (for gamma radiation). It has been found that the G value increases substantially with temperature, which is to say that the efficiency of radiolytic reaction increases with temperature. The net G value of Reaction (1) preferably is limited to about 9.7 for reasons that will become evident. The ideal G for $H_2$ from hydrogen sulfide is 106.8. Therefore, the efficiency of radiolytic reaction of Reaction (1) is intentionally limited to 9.7/106.8 or 0.091. Energy in the amount of 21.6 kilocalories (kcal) is needed to dissociate one gram-mole of hydrogen sulfide. Therefore, input radiation energy needed to drive Reaction (1) in vessel 10 is 21.6/0.091 or 236.8 kcal/gram-mole. The remaining input energy of 215.2 kcal/gram-mole (236.8 minus 21.6)—i.e. radiant energy not absorbed in effecting Reaction (1)—operates to raise the temperature of vessel 10 to the desired 1100° K. to allow for heat removal to drive Reactions (2) and (5) as previously noted and to generate power for the various separation steps to be described. In the drawings and remaining description, all energies and concentrations are based upon one gram-mole of hydrogen sulfide dissociated in Reaction (1).

The required 236.8 kcal/gram-mole radiation energy input may be obtained from known radiation sources such as a high-temperature nuclear fission reactor. Preferably, energy for Reaction (1) is obtained as fast neutrons and gamma rays from an inertial confinement fusion reactor. To achieve desired conversion in spite of back reaction at the elevated temperature of 1100° K., a radiation dose rate of $10^{25}$ electron volts/gram/second or more would be preferred. Under such conditions, 20% dissociation in vessel 10 may be expected. Vessel 10 may comprise a stainless steel chamber lined with refractory material except at a window for admitting radiation. Cladding of the radiation window may be effected by aluminum-coated carbon steel.

The products of Reaction (1) are fed to a heat exchange and product separation stage 12 in which the sulfur is condensed and the hydrogen product of the overall process is separated. Liquid sulfur is fed from stage 12 to a vessel 14 in which Reaction (2) takes place at 40 atm. pressure and 1000° K. ($\Delta H = +37.6$ kcal). The radiation-heated and partially (20%) dissociated products of Reaction (1) in vessel 10 are also fed to a heat exchanger 16 in vessel 14 to provide the required heat of reaction. Vessel 14 may comprise a fluidized bed reactor wherein the calcium carbonate is treated as a fine powder and the sulfur (at least partially gasified) is bubbled upwardly through the powder bed. The solid calcium sulfide and gaseous sulfur dioxide and carbon dioxide products of Reaction (2) are fed separately to a second heat exchange and product separation stage 18. A reaction vessel 20 for Reaction (3) at 40 atm. and 350° K. receives calcium sulfide and carbon dioxide from stage 18 and water from a feed source 23. Reaction (3) being exothermic ($\Delta H = -18.6$ kcal), a heat exchanger 24 within vessel 20 receives cooling water CW from a suitable source (not shown). The powdered calcium carbonate product of Reaction (3) is fed by a pneumatic conveyor (FIG. 2) through heat exchange and separation stage 18 to vessel 14. The gaseous hydrogen sulfide product of Reaction (3) is recycled to vessel 10 through heat exchange stage 12.

The gaseous sulfur dioxide product of Reaction (2) at stage 18 is fed to a heat exchange and product separation stage 30, and thence to a vessel 26 where it is reached with water at 204 atm. and 573° K. Reaction (4) in vessel 26 is exothermic ($\Delta H = -30.0$ kcal). The liquid sulfur product of Reaction (4) is recycled to vessel 14 for use in Reaction (2). The aqueous solution of sulfuric acid product of Reaction (4) is fed to a third heat exchange and product separation stage 30, and thence to the vessel 32 for Reaction (5). Heat of reaction for Reaction (5) (H = +45.8 kcal) is supplied by a heat exchanger 34 within vessel 32 coupled to receive the radiation-heated and partially dissociated products of Reaction (1), with the reaction taking place at 1 atm. and 1100° K. Steam, sulfur dioxide and oxygen, the gaseous products of Reaction (5), (with some undissociated sulfur trioxide and a small amount of sulfuric acid) are fed to heat exchange and separation stage 30. The water and sulfur dioxide are condensed and fed to reaction vessel 26. The oxygen is separated as a second product of the overall process. Vessel 20 may comprise a fluidized bed reactor. Vessel 26 may comprise an autoclave. The structure of vessel 32 will be discussed in connection with FIG. 6.

Heat exchange and product separation stage 12 is illustrated in schematic detail in FIG. 3. The hydrogen sulfide, hydrogen and sulfur product mixture of Reaction (1) (20% dissociated) is fed at 40 atm. and 1100° K. in stage 12 through the successive heat exchangers 40,42 to a liquid/gas separator 44. Liquid sulfur is fed at 525° K. from separator 44 to reaction vessel 14 (FIGS. 1 and 2) are previously described. Gaseous hydrogen sulfide and hydrogen at a temperature of 525° K. and 40 atm. are fed from separator 44 through the successive heat exchangers 46,48 to another liquid/gas separator 50. Liquid hydrogen sulfide at 280° K. from separator 50 is fed by a pump 52 back through successive heat exchangers 48,46,42,40 to a junction 54. Gaseous hydrogen sulfide and hydrogen at a temperature of 280° K. and 40 atm. are fed from separator 50 through a heat exchanger 56 to a third separator 58, from which liquid hydrogen sulfide at a temperature of 180° K. is fed by a pump 60 successively through heat exchangers 56,48 and then joined with the liquid hydrogen sulfide from pump 52. Gaseous hydrogen sulfide and hydrogen are fed from separator 58 to a solid adsorber 62. Free hydrogen at 195° K. and 40 atm. is routed through heat exchangers 56,48 to emerge at 300° K. and 40 atm. as the primary product of the overall process.

Gaseous hydrogen sulfide from adsorber 62 is fed by a compressor 64 at a temperature of about 400° K. to join that from pumps 52,60 between heat exchangers 46,42. Gaseous hydrogen sulfide at 340° K., 40 atm. from reaction vessel 20 (FIGS. 1 and 2) is fed to a pump 68 through a heat exchanger 66 wherein it is liquified, and thence through successive heat exchangers 46,42,40 to junction 54. From junction 54, hydrogen sulfide, now in a gaseous phase, is fed at 40 atm. and 1050° K. to reaction vessel 10 (FIGS. 1 and 2). The several heat exchangers, liquid/gas separators, pumps and compressor of heat exchange and product separation stage 12 illustrated in detail in FIG. 3 may be of any suitable construction. Cooling water CW is fed to heat exchangers 42,48 and 66. Refrigeration work at energy levels of 4.42 kcal and 3.1 kcal (per gram-mole H$_2$S dissociated) is performed at heat exchangers 48 and 56 respectively. Exchanged heat q at heat exchangers 40,42,46,48,56 and 66 are 11.75, 35,53, 7.4, 1.73 plus refrigeration, about 0.6 plus refrigeration and 3.45 kcals respectively.

Heat exchange and product separation stage 18 is illustrated in schematic detail in FIG. 2. Powdered calcium sulfide is fed from beneath reaction vessel 14 (FIGS. 1 an 2) at 1000° K., 40 atm. through a heat exchanger 70 in stage 18, and thence at 350° K. to reaction vessel 20. A gaseous mixture of sulfur dioxide and carbon dioxide (with traces of sulfur) at 900° K., 40 atm. is fed through heat exchanger 70, and thence through the heat exchangers 72,74 at 680° K. and 325° K. respectively to a heat-exchange/separator 76 at 305° K. Gaseous carbon dioxide at 40 atm. and 278° K. is fed from separator 76 to vessel 20. Liquid sulfur dioxide at 320° K. is fed from separator 76 through stage 30 to reaction vessel 26 (FIGS. 1 and 4). Vessel 20 receives water at 300° K. from feed 23. The powdered calcium carbonate product of Reaction (3) is fed from beneath vessel 20 at 350° K. to a pneumatic conveyor 78, and whence it is lifted through heat exchanger 70 and thence at 900° K. to a gas/powder separator 80. Powdered calcium carbonate is directed from separator 80 to reaction vessel 14 while conveyor gas is returned through heat exchanger 70.

Conveyor 78 requires 0.2 kcal energy as work input (per gram-mole H$_2$S dissociated) for operation. Refrigeration work at energy levels of 0.07 kcal and 0.6 kcal is added at heat exchangers 74 and 76 respectively. Cooling water CW is directed through heat exchanger 72. Exchanged heat q is 17.3, 5.96, 0.3 and 2.3 kcal at heat exchangers 70,72,74 and heat-exchange/separator 76 respectively. The products of Reaction (1) are fed at 40 atm. and 1100° K. to heat exchanger 16 in reaction vessel 14 as previously described. Heat exchanged in vessel 14 is 66.2 kcal, a portion of which energy supplies the heat of reaction and the remainder operating to heat the reagents and products. From heat exchanger 16, the products of Reaction (1) are fed to heat exchange at 82 with water to raise steam for power (q=60.6 kcal), and thence to vessel 10 at 40 atm. and 925° K.

Heat exchange and product separation stage 30 is illustrated in schematic detail in FIGS. 4 and 5. Liquid sulfur is separated at 90 from the aqueous sulfuric acid product of Reaction (4) in vessel 26 and fed through a valve 150 at 573° K., 40 atm. to vessel 14 (FIGS. 1 and 2). A solution of sulfuric acid and water is fed from separator 90 through an expansion valve to a flash evaporator 152. Water from evaporator 152 is fed through a heat exchange 154 (q=20 kcal) to a pump 156. A solution of water and sulfuric acid from evaporator 152 is fed to a second evaporator 158 from which water is routed through heat exchange with cold water at 160 and 162 (q=4.6 kcal and 31.2 kcal) to pump 156. A solution of water and sulfuric acid from evaporator 158 is fed to a third evaporator 164 from which water is fed to heat exchanger 160 and sulfuric acid (98.3 weight percent) at 611° K. to a junction 96 (FIG. 5), and thence at about 585° K. (after mixture to be described) to a heat exchanger 98 (q=16.4 kcal).

Acid at 585° K. is then fed to reaction vessel 32 which has heat exchanger 34 to receive Reaction (1) products at 40 atm. and 1100° K. as previously described. Exchanged heat q in vessel 32 is 72.06 kcal, a portion supplying the required heat of reaction and the remainder heating reagents and products. From vessel 32, a gaseous mixture of steam, oxygen, sulfur dioxide, sulfur trioxide and trace sulfuric acid is fed at 1080° K., 1 atm. through heat exchanger 98 into heat exchanger at 100 (q=12.78 kcal) with cooling water CW, and thence to a separator 102. Condensed concentrated sulfuric acid at 585° K. is fed from separator 102 to junction 96 for mixture with the flow from vessel 26 and feed to vessel 32. The remaining gas at 585° K. is fed through heat exchanger 94 (q=6.01 kcal) to raise steam, then at 340° K. into heat exchange at 104 (q=7.96) with cooling water and thence at 320° K. to a separator 106.

Water is fed from separator 106 to pump 156 (FIG. 4), and thence through heat exchanger 154 to heat exchange at 166 with steam (q=21 kcal). From heat exchanger 166 the water is fed at 490° K. to vessel 26. The remainder from separator 106 is fed through a compressor 108 (FIG. 5) to heat exchange with cooling water at 110 (q=9.8 kcal). The mixture from heat exchanger 110 at 320° K., 40 atm. is fed to a separator 112 from whence water is returned at 320° K. to pump 156, sulfur dioxide liquid is fed by a pump 114 at 40 atm. and 320° K. to pump 168, and the remainder is fed through a heat exchanger 116 (q=1.2 kcal) and thence at 205° K. to a separator 118. Refrigeration work at an energy level of 0.31 kcal is added to heat exchanger 116. From separator 118 liquid sulfur dioxide is returned by a pump 120 at 205° K. through heat exchanger 116 and thence at 300° K. to a pump 168. The sulfur dioxide from separator 76 (FIG. 2) is likewise fed to pump 168. The output of pump 168 joins the output of pump 156 at heat exchanger 154. The remaining output from separator 118 (FIG. 5) is fed to a solid adsorber 122. Oxygen from adsorber 122 is fed at 220° K., 40 atm. to heat exchanger 116 and thence at 300° K., 40 atm. as the process co-product. Sulfur dioxide from adsorber 122 is fed by a compressor 124 to pump 168.

The various heat exchangers in FIGS. 4 and 5, particularly those containing sulfuric acid, may be constructed of vitreous enamel-coated steel or, preferably, silica glass. A preferred embodiment of reaction vessel 32 is illustrated in FIG. 6 and comprises a stainless steel shell 130 internally coated with refractory material 132. A wall 134 of silica glass divides the internal chamber of vessel 32 and has a plurality of U-shaped silica glass tubes 136 extending therefrom, as many as can practically be placed within region 137. The remaining vessel section is divided by a partition 138 of refractory material. The divided vessel sections respectively communicate with inlet and outlet fittings 140,142 and with opposite ends of tubes 136. Inlet and outlet fittings 144,146 are also provided in the chamber wall. Thus, sulfuric acid is fed from inlet 140 through tubes 136 to outlet 142, while the products of Reaction (1) are fed from inlet 144 through vessel 32 in heat exchange with tubes 136 to outlet 146. Catalysts for Reaction (5), such as platinum, alumina pellets or iron oxide, may be packed into heat exchange tubes 136.

Although the invention has been described in detail in connection with hydrogen sulfide as the primary working fluid, other materials could be used and will suggest themselves to persons skilled in the art in view of the foregoing description. In its broadest aspects the invention contemplates utilization of materials which dissociate endothermically. That is, they dissociate when energy is added to them. Such dissociation is a means of energy absorption or energy storage and does not occur spontaneously or by the aid of a catalyst. Moreover, the invention contemplates utilization of materials whose susceptibility to endothermic radiolytic dissociation (i.e. G value) increases with temperature. Such material is simultaneously subjected to both heat and radiation, and dissociated hydrogen or high-energy-containing intermediate material is extracted as a primary product of reaction. The remainder is preferably cycled through a number of reaction steps with secondary working fluids including water for regeneration of the primary working fluid. Advantageously, heat content of the primary reaction products may be used to drive the secondary reactions and also to obtain usable work.

The invention claimed is:

1. A combined thermochemical and radiolytic process for generation of hydrogen comprising the steps of:
   (a) subjecting hydrogen sulfide at 1100° K. and 40 atmospheres pressure to radiation energy such that at least a portion of said hydrogen sulfide is dissociated into hydrogen and sulfur,
   (b) separating the hydrogen product of step (a),
   (c) reacting the sulfur product of step (a) with calcium carbonate at 525° K. and 40 atmospheres pressure to form calcium sulfide, sulfur dioxide and carbon dioxide,
   (d) reacting the calcium sulfide and carbon dioxide products of step (c) with water at 350° K. and 40 atmospheres pressure to form calcium carbonate and hydrogen sulfide,
   (e) reacting the sulfur dioxide product of step (c) with water at 573° K. and 204 atmospheres pressure to produce sulfuric acid and sulfur,
   (f) reacting the sulfuric acid product of step (e) at 1100° K. and one atmosphere pressure to produce water and oxygen,
   (g) recycling the sulfur product of step (e) and the calcium carbonate product of step (d) to said step (c), and
   (h) recycling the hydrogen sulfide product of said step (c) to said step (a) to form a closed cycle process utilizing hydrogen sulfide as a working fluid for generating hydrogen from water.

2. In a cyclic endothermic process for generation of hydrogen by dissociation of a hydrogen-containing material including the steps of: (a) subjecting a said hydrogen-containing material to combined heat and radiolytic energy such that said radiolytic energy operates to dissociate at least a portion of said material at elevated temperature into hydrogen and a secondary material, (b) separating said hydrogen product of step (a), (c) reacting said secondary material of said step (a) with additional chemicals including water so as to dissociate said water and reconstitute said hydrogen-containing material, and (d) recycling the hydrogen-containing material product of said step (c) to said step (a) to form a closed cycle process utilizing said hydrogen-containing material as a working fluid for generating hydrogen from water; the improvement comprising the step of increasing efficiency of dissociation in said step (a) by selecting as said working fluid a hydrogen-containing material having a dissociation sensitivity to radiolytic energy which increases with temperature, such that application of combined heat and radiolytic energy in said step (a) increases yield of said hydrogen product over the yield due to said heat and said radiolytic energy taken separately.

3. The process set forth in claim 2 wherein said hydrogen-containing material is hydrogen sulfide.

4. The process set forth in claim 3 wherein only a portion of said radiation energy in said step (a) is absorbed in dissociation of said hydrogen sulfide, the remainder of said radiation energy being utilized to raise said hydrogen sulfide and said hydrogen and sulfur products to said condition of high temperature.

5. The process set forth in claim 2 comprising the additional step of: (e) utilizing heat energy in the products of said step (a) to drive at least a portion of said step (c).

6. The process set forth in claim 2 wherein said step (c) comprises the steps of: (c1) reacting said sulfur product of said step (a) with calcium carbonate to form calcium sulfide, sulfur dioxide and carbon dioxide, (c2) reacting said calcium sulfide and said carbon dioxide with said water to form calcium carbonate for recycling to said step (c1) and hydrogen sulfide for recycling to said step (a), (c3) reacting said sulfur dioxide with said water to form sulfuric acid and sulfur for recycling to said step (c1), and (c4) dissociating said sulfuric acid to form oxygen, water and sulfur dioxide for recycling to said step (c3).

7. The process set forth in claim 6 comprising the additional step of: (e) utilizing heat energy in the products of said step (a) to drive said steps (c1) and (c4).

8. The process set forth in claim 6 or 7 comprising the additional step of separating said oxygen product formed in said step (c4).

* * * * *